(12) United States Patent
Kato et al.

(10) Patent No.: US 8,277,623 B2
(45) Date of Patent: Oct. 2, 2012

(54) CONDUCTIVE DIAMOND ELECTRODE AND OZONE GENERATOR USING THE SAME

(75) Inventors: Masaaki Kato, Tamano (JP); Rie Kawaguchi, Tamano (JP)

(73) Assignee: Chlorine Engineers Corp., Ltd., Chuo-ku, Tokyo (JP)

( * ) Notice: Subject to any disclaimer, the term of this patent is extended or adjusted under 35 U.S.C. 154(b) by 163 days.

(21) Appl. No.: 12/803,101

(22) Filed: Jun. 18, 2010

(65) Prior Publication Data

US 2010/0320082 A1 Dec. 23, 2010

(30) Foreign Application Priority Data

Jun. 23, 2009 (JP) ................................. 2009-148342

(51) Int. Cl.
*C25B 11/12* (2006.01)
*B01J 19/08* (2006.01)

(52) U.S. Cl. ........ 204/294; 204/252; 204/263; 204/283; 204/176; 422/186.07; 422/186.18; 422/186.22

(58) Field of Classification Search .................. 707/101, 707/812, 706, 200, 664, 802, 102, 709, 783; 726/23, 24; 204/294, 252, 263, 283
See application file for complete search history.

(56) References Cited

U.S. PATENT DOCUMENTS

| 2008/0264780 | A1* | 10/2008 | Kato et al. | ..................... 204/252 |
| 2010/0006450 | A1* | 1/2010 | Whitehead et al. | ........... 205/742 |
| 2010/0084259 | A1* | 4/2010 | Kato et al. | ................. 204/157.5 |
| 2010/0089765 | A1 | 4/2010 | Arihara et al. | |

FOREIGN PATENT DOCUMENTS

| JP | 2007-044630 A | 2/2007 |
| JP | 2009-007655 A | 1/2009 |

OTHER PUBLICATIONS

Official Journal of the European Union, Directive 2002/95/EC of the European Parliament and of the Council of Jan. 27, 2003, Feb. 13, 2003, L 37/19-L37/23.

* cited by examiner

*Primary Examiner* — Bruce Bell
(74) *Attorney, Agent, or Firm* — Chapman & Cutler LLP

(57) ABSTRACT

The present invention relates to a conductive diamond electrode, comprising a substrate having a plurality of convex and concave part disposed over the entire surface of the conductive diamond electrode, and a diamond film coated on the surface of said substrate, wherein the width of each convex part of said convex and concave part is in a range from 0.2 mm to 1 mm. The present invention can provide a conductive diamond electrode, applying a thin film of conductive diamond and a thick substrate, being less expensive than a self-supported type conductive diamond electrode and also having mechanical strength enough to be used in the zero-gap electrolysis, functioning stably for a long time with smooth water supply or gas liberation, and an ozone generator using the conductive diamond electrode.

15 Claims, 11 Drawing Sheets

Fig. 3-1
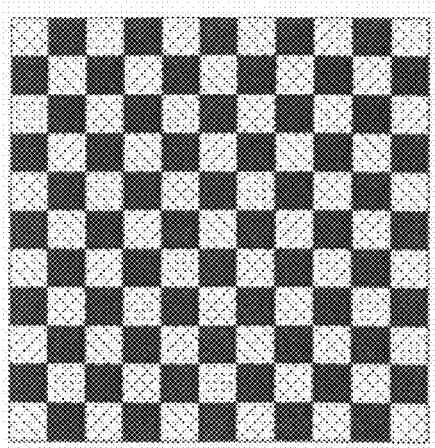
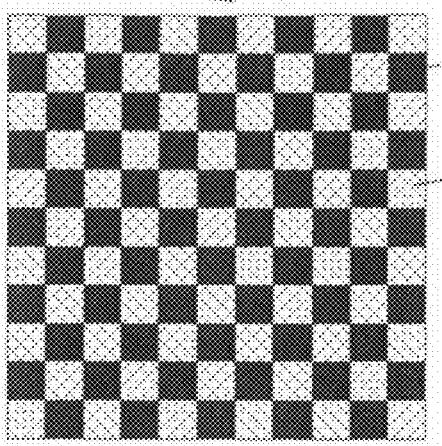
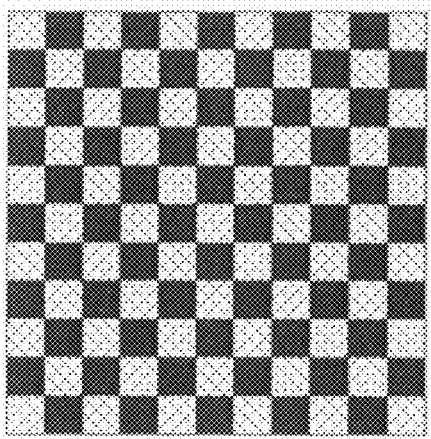
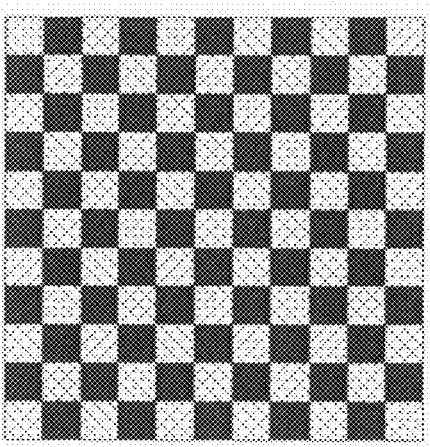

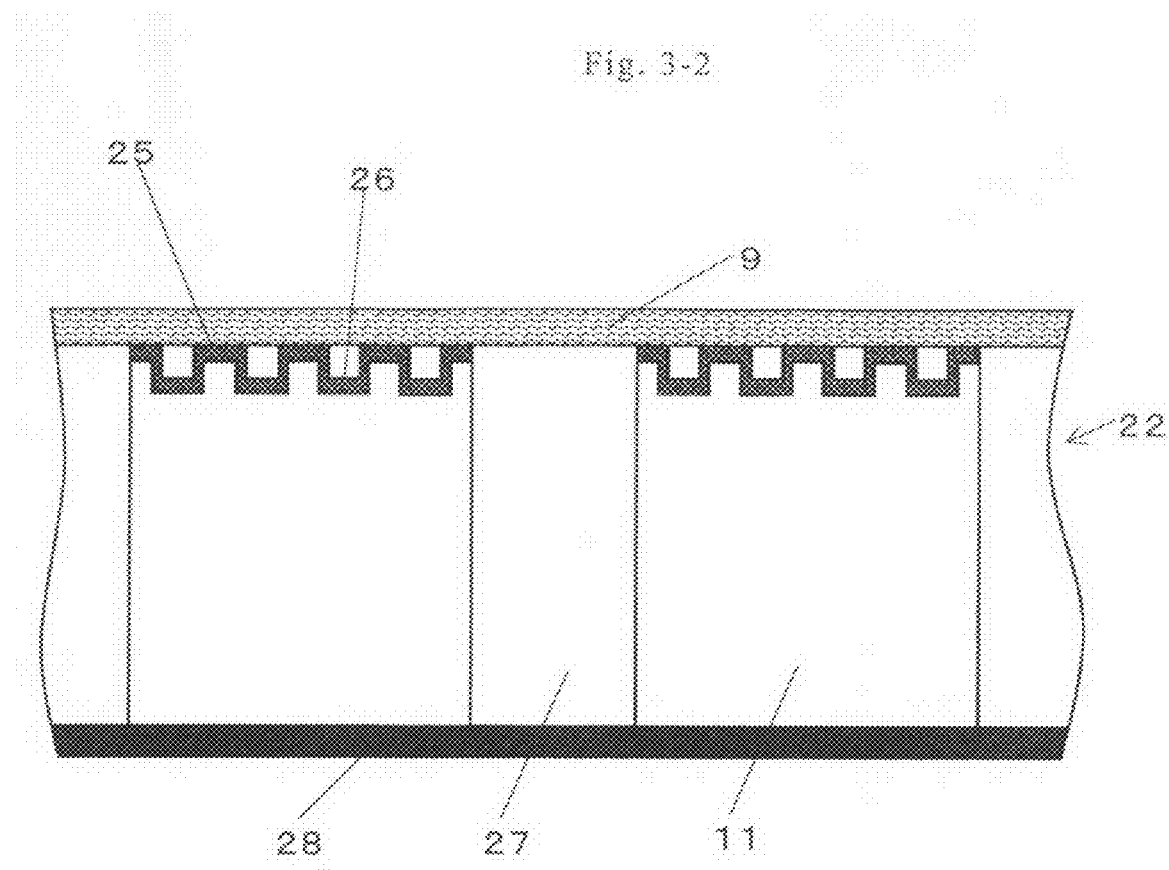

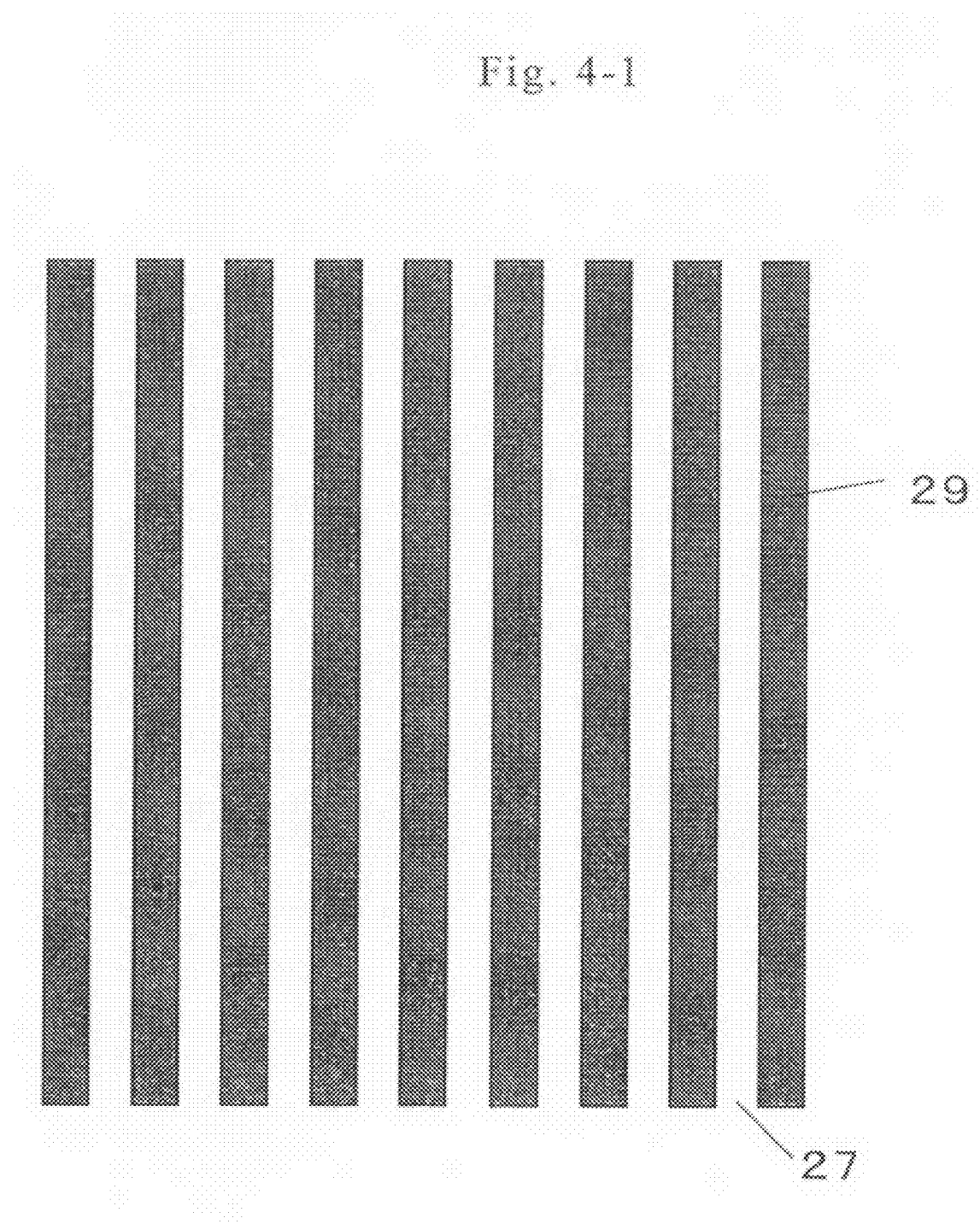

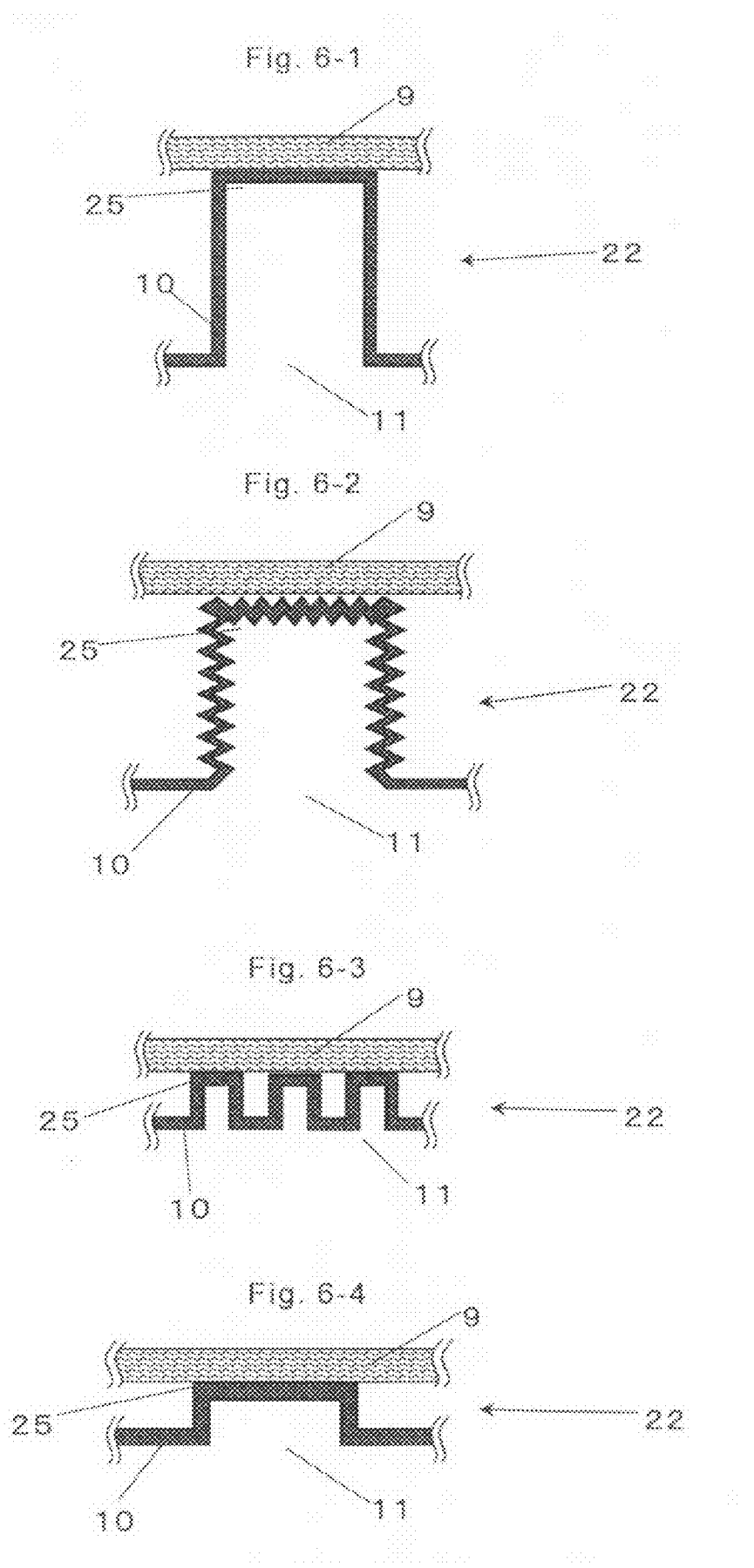

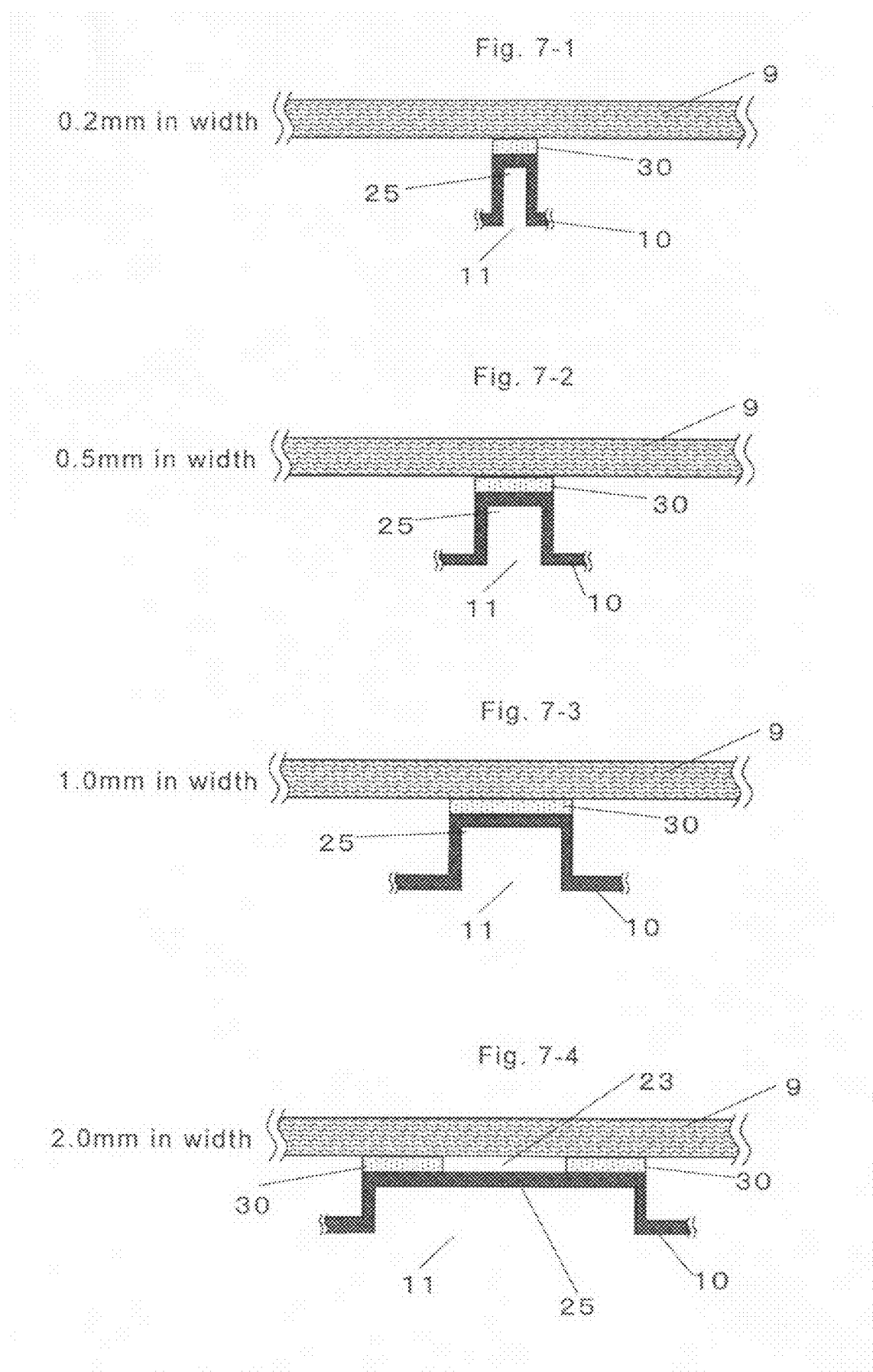

CONDUCTIVE DIAMOND ELECTRODE AND OZONE GENERATOR USING THE SAME

CROSS-REFERENCE TO RELATED APPLICATIONS

This application is based upon and claims the benefit of priority of Japanese Patent Application 2009-148342, filed on Jun. 23, 2009; the entire contents of which are incorporated herein by reference.

BACKGROUND OF THE INVENTION

1. Field of the Invention

The present invention relates to a conductive diamond electrode and an ozone generator using the conductive diamond electrode.

2. Background Art

Ozone is known as a substance, in the nature, having an extremely strong oxidizing power and has been widening its applications over various industries. For instance, ozone is utilized in waterworks and sewage plants for the sterilizing and decolorizing treatments. Another advantage of ozone is the nature that it turns to harmless oxygen through autolysis with time lapse. Ozone, therefore, is appreciated as a chemical used for sterilizing and decolorizing processes which are easier and safer in handling than the former processes by chemicals, without secondary contamination by chemical residues or reaction by-products, offering an easy post-treatment.

Well known methods of ozone production include the UV lamp process, the silent discharge process, and electrolysis process. The UV lamp process produces ozone through exciting oxygen by UV rays, available from a relatively simple unit, but the production volume is limited and therefore, popularly used for deodorizing rooms and cars. The silent discharge process is one of the most prevalent and commonly used ozone generation methods. It is widely applied for various purposes ranging from simple room deodorizing by a small-scale ozonizer to industrial water treatment by a large-scale ozonizer with an output capacity of several tens kilograms per hour. The silent discharge process uses oxygen gas or oxygen in air as feed material, and generates ozone through excitation by electric discharge.

The electrolysis process generates ozone in the generated anodic gas through electrolysis of water. Ozone gas can be obtained also through the electrolysis of aqueous solutions including that of sulfuric acid; however, if the electrolysis is carried out with ultrapure water as raw material applying a solid polymer electrolyte diaphragm, known as perfluorosulfonic acid cation exchange membrane, highly concentrated and purified ozone is obtained. The ozone production system by ultrapure water electrolysis has been widely used in the precision cleaning fields such as for semiconductor wafers or LCD substrates, since it applies ultrapure water as raw material and therefore, the generated gas contains impurities at an extremely low level.

Conventionally, lead dioxide ($PbO_2$) deposited on the conductive porous metals including titanium by such means as electrolytic plating has been utilized as an anode for the electrolytic ozone process for its superior current efficiency in ozone gas generation. When ultrapure water is electrolyzed at a room temperature in a cell with perfluorosulfonic acid cation exchange membrane applied as the solid polymer electrolyte diaphragm and the lead dioxide applied as the anode, the current efficiency in ozone generation is usually 10-15%, even as high as 20% at a high current density. Although perfluorosulfonic acid cation exchange membrane is consumed with time during electrolysis, the amount of consumption is small, and therefore, a constant ozone output and operation safety can be maintained in more than two consecutive years of electrolysis run.

As above-mentioned, the lead dioxide anode shows a high current efficiency in ozone generation under a high current density and in continuous electrolysis operation, as well as good long-term stability, but the lead dioxide anode is susceptible to be reduced and deteriorative in a reducing environment. For instance, in a suspension of electrolysis operation, the lead dioxide on the electrode surface is easily reduced to lead hydroxide ($Pb(OH)_2$), lead oxide ($PbO$) or lead ion ($Pb^{2+}$) through chemical reactions with reducing materials including hydrogen remaining in the electrolytic cell or the electrolytic reducing reaction from cathodic polarization. Since these reduced substances have neither ozone generation ability nor electronic conductivity, such phenomenon is observed that the ozone generation capacity decreases in a resumed operation after suspension.

Therefore, the electrolytic ozone generator system applying lead dioxide electrodes usually has a mechanism to supply protective current in a range of $1/10$-$1/1000$ of electrolysis current normally applied to the electrolytic cell, to avoid performance deterioration during a cease of operation. Such mechanism, composed of a DC power source dedicated to the protective current supply, a battery, and a control system, constantly monitors state of the electrolytic cell so that no-current state does not occur even instantaneously. By this mechanism, lead dioxide anodes are protected from being exposed to a reducing environment even during the electrolysis operation cease; however, provision of such mechanism results in complicated working mechanism and configuration of the electrolytic ozone generator system, leading to a higher equipment costs.

Moreover, the lead dioxide anode contains a good amount of lead. Nowadays, use of lead tends to be reduced in all industrial commodities for its toxicity and legislative requirements, such as ROHS guide line (Refer to Non-Patent Document 1). The ROHS guide line is related to Directive 2002/95/EC of the European parliament and of the council of 27 Jan. 2003 on the restriction of the use of certain hazardous substances in electrical and electronic equipment.

On the other hand, it is known that the water electrolysis using conductive diamond as anode, where its conductivity has been induced by dopant such as boron added in the crystal structure, gives a current efficiency as high as 40% in terms of ozone output, which is fur higher than the electrolysis using the lead dioxide anode. Moreover, the conductive diamond anode is superior in chemical and electrochemical stability and gives no change in property and electrolytic performance even in the reducing environment where lead dioxide changes in quality and degrades. Accordingly, the protective current mechanism, which is essential in the electrolytic ozone generator system using lead dioxide anodes, is not required, leading to a simple equipment design. As a matter of fact, neither carbon nor boron, constituting the conductive diamond is the object materials in the ROHS guide line.

The conductive diamond electrode is filmed on a substrate by the processes as HFCVD and MWCVD. For either case, the substrate for the conductive diamond film is required to withstand a high temperature around 1000 degree Celsius in hydrogen atmosphere, which belongs to the coating environment, and to maintain the property of adhesion to the conductive diamond film, even under temperature changes during the treatment processes. As the substrate for the CVD synthetic diamond, silicon is commonly used, but more specifically, conductive silicon is typically used for the substrate of the conductive diamond electrode, which requires conductivity for functioning as a current distributor at the time of electrolysis, in addition to durability at the filming process. Such materials as carbon, titanium and niobium are also serviceable, but these are inferior in adhesion of diamond film or durability to a high temperature hydrogen atmosphere at the time of filming, showing defect that the conductive diamond film tends to peel off from the substrate during the electrolysis operation.

In the process of zero-gap water electrolysis, where ultrapure water with a very large electric resistance is directly electrolyzed, electrolysis is performed at the triple phase boundary of water/electrode catalyst/ion exchange membrane, as the electrochemical reaction field, where the electrode prepared by depositing electrode catalyst on a porous electrode substrate is pressingly attached to an ion exchange membrane. Also in the case of zero-gap water electrolysis using the conductive diamond electrode as electrode, water electrochemical reaction is performed at a triple phase boundary involving water, prepared by pressing the conductive diamond electrode against the perfluorosulfonic acid cation exchange membrane. In order to perform electrolysis for a long time stably, water must be constantly supplied to the contact part of the electrode catalyst with the ion exchange membrane, preparing a stable triple phase boundary.

If water is not supplied sufficiently to the contact part of the electrode catalyst and the ion exchange membrane and then the stable provision of the triple phase boundary is not achieved, not only raw material is not supplied to the electrochemical reaction field, but also the water content of the ion exchange membrane, as electrolyte, decreases. The water content of the ion exchange membrane has a close relationship with the conductivity of the ion exchange membrane; and decreased water content leads to a significant decrease in conductivity, further leading to increased cell voltage up to the state of electrolysis failure.

Moreover, cell voltage increase generates large Joule heat, resulting in overheating of electrode and electrolyte. Ozone has autolysis property, which is promoted by heat, and therefore, for better ozone yield, electrolysis should be performed at as a low temperature as possible.

In general, the formation of triple phase boundary in the zero-gap water electrolytic cell systems including the hydrogen generation system and the electrolytic ozone generator system is made in such a manner that an electro-catalytic metal or a metal oxide is deposited on the surface of a substrate having both conductivity and porosity, such as metal fiber or a porous carbon plate to prepare a porous electrode and then the porous electrode is pressed against the surface of a perfluorosulfonic acid cation exchange membrane; or the solution in which perfluorosulfonic acid cation exchange membrane monomer is dissolved is coated on the electrode surface and then the electrode is bonded with perfluorosulfonic acid cation exchange membrane by means of hot pressing, etc. to obtain sufficient conjugation. In general, the porous material applied is the material having porosity at a rate of 40% or more to perform smooth supply or liberation of water and gas.

As above-mentioned, silicon is the most suitable material for the substrate which can maintain a good adhesion with the conductive diamond film. For silicon, which is a brittle material, porositization in excess of 40% in porosity is difficult by fiberization or micro-pore formation, though it is possible for metals. Accordingly, in order to use silicon as the electrode structure performing zero-gap electrolysis, silicon substrate is processed to have convex-concave shapes and through holes to be functioned as a water supply path and a gas vent path, and the convex end of them is used as electro-catalytic portion of the triple phase boundary.

The shapes of convex and concave part are formed on the silicon plate material by lithographic patterning and etching by reactive gas or soluble solution. In this step, if sufficiently fine shaping is not achieved on the silicon plate, the area of the triple phase boundary, i.e., electrochemical reaction field will not be formed largely enough to provide adequate current supply to the electrolytic cell, leading to limited production amount of the targeted electrolysis product. Moreover, water content of the Non-Patent Document 1, called decreases due to stagnant electrolytic gases on the electrochemical reaction field; then the electric conductivity decreases, and the cell voltage will rise with time up to a difficult condition of current supply. In these view points, the surface of the convex part must be prepared finely so that water can be introduced to the entire surface and at the same time, generated electrolytic gas can be liberated from the electrode swiftly.

Preparation of the fine convex part on a silicon substrate, diamond film and the silicon substrate treated with diamond film on its surface is made by means of lithography. For the processing, expensive equipments with a high accuracy, such as a dry etching unit or a lithography unit are used, resulting in a high manufacturing cost. Moreover, the surface of the convex part prepared by the dry etching tends to be hydrophobic, and if used as the electrode for electrolysis, the surface is easily covered with electrolytically produced hydrogen or oxygen gas, interfering with the supply of water which is the material of electrochemical reaction.

When an electrode structure is fabricated by processing a substrate with extremely high planarity as seen in the silicon wafer commercially available, perfluorosulfonic acid cation exchange membrane tightly adheres to the electrode substrate filmed with conductive diamond. Then, water becomes hard to intrude into the entire surface of the convex part during the electrolysis operation, hindering electrochemical reaction. On the other hand, if the surface of the substrate is rough and not finely prepared, the area of triple phase boundary becomes large and advantageous in terms of water supply and liberation of electrolytically produced gases, since indented tops by the conductive diamond film having further fine indentation are formed on the surface of the convex part. However, since the perfluorosulfonic acid cation exchange membrane is forced to contact the electrode substrate by pressing, notches or pinholes may be developed on the perfluorosulfonic acid cation exchange membrane at the time of assembling the electrolytic cells. Therefore, the surface roughness of the electrode substrate must be controlled within a proper range.

Patent Document 1 describes that a conductive diamond electrode having a porous or mesh structure is effective to preserve supply and vent paths for water and gases; more in detail, it is suggested that in order to remove bubbles efficiently, pores should be provided to the substrate or the self-supported type conductive diamond electrode. In order to realize this, dry etching is required for the self-supported type conductive diamond electrode, which is weak in strength, by using a mask prepared by such methods as lithography; however, such processing method and processing equipment are expensive. Whereas, formation of pierced pores reduces the surface area capable of electrolyzing, and processing is complicated. For the self-supported type conductive diamond electrode, which is weak in mechanical strength, manufacturing is difficult.

In Patent Document 2, the self-supported type conductive diamond electrode in column state is disclosed as effective to increase the triple phase boundary area, but as with the case in Patent Document 1, the processing is complicated and difficult.

CITATION LIST

Patent Document
[Patent Document 1] Official Gazette of Japanese Unexamined Patent Application Publication No. 2007-44630.
[Patent Document 2] Official Gazette of Japanese Unexamined Patent Application Publication 2009-7655
Non-Patent Document
[Non-Patent Document 1] Restriction of the Use of Certain Hazardous Substances in Electrical and Electronic Equipment 2002/95/EG

SUMMARY OF THE INVENTION

Problems to be Solved by the Invention

It is an object of this invention to solve the problems in the former methods and to provide a conductive diamond electrode that is low in cost, has sufficient mechanical strength capable of being used in the zero-gap electrolysis, and functions, stably for a long time, to supply water and liberate generated gases smoothly. It is another object of this invention to provide an ozone generator applying said conductive diamond electrode, capable of generating ozone stably for a long time at a high current efficiency.

Means for Solving the Problem

To solve said problems, the present invention aims to provide a conductive diamond electrode, comprising a substrate having a plurality of convex and concave parts over its entire surface and a diamond film applied on the surface of the substrate with a width of each convex part of the convex and concave part being in a range from 0.2 mm to 1 mm.

The second means to solve the problems by the present invention relates to the conductive diamond electrode, wherein the shape of each convex part of said convex and concave part comprises circle, ellipse or polygon.

The third means to solve the problems by the present invention relates to the conductive diamond electrode, wherein the substrate is provided with a through hole.

The fourth means to solve the problems by the present invention relates to the conductive diamond electrode, wherein a plurality of conductive diamond electrodes is segmented for provision and is disposed with interval to provide paths for electrolyte and generated gases between these conductive diamond electrodes.

The fifth means to solve the problems by the present invention further comprises a plurality of strip-state substrates or the substrates bristling in projection state in all directions, disposed over with interval on the entire surface of the conductive diamond electrode, and a diamond film applied on the substrate surface, characterized in that the width of the substrate is in a range from 0.2 mm to 1 mm.

The sixth means to solve the problems by the present invention relates to an ozone generator, wherein an anode and a cathode are closely adhered to each face of the solid polymer electrolyte diaphragm; a perfluorosulfonic acid cation exchange membrane is used as the solid polymer electrolyte diaphragm; an electrode having a conductive diamond film on its surface is used as the anode; pure water is supplied to an anode compartment; the water is electrolyzed by DC current supplied to the anode-cathode gap; and ozone is produced from the anode compartment, characterized in that said conductive diamond electrode is used.

The seventh means to solve the problems by the present invention relates to an ozone generator, wherein an anode and a cathode are closely adhered to each face of the solid polymer electrolyte diaphragm; a perfluorosulfonic acid cation exchange membrane is used as the solid polymer electrolyte diaphragm; the electrode having the conductive diamond film on its surface is used as the anode; pure water is supplied to an anode compartment; the water is electrolyzed by DC current supplied to the anode-cathode gap; and ozone is produced from the anode compartment, comprising a structure including an electrode, as anode, having a substrate with a plurality of the convex and concave parts over the entire surface, being coated with conductive diamond film, said perfluorosulfonic acid cation exchange membrane having said conductive diamond film of said anode being pressed by a surface pressure at 20 kgf/cm$^2$ or more on one face and a cathode pressed on the other face of said perfluorosulfonic acid cation exchange membrane.

Technical Advantage of the Invention

According to the present invention, it is possible to obtain a conductive diamond electrode which is less expensive than the self-supported type conductive diamond electrode, having a sufficient mechanical strength capable of being used in the zero-gap electrolysis, and functioning, stably for a long time, to supply water and liberate generated gases smoothly and an ozone generator.

BRIEF DESCRIPTION OF THE DRAWINGS

FIG. 1-2 A schematic view of another embodiment of an electrolytic cell to implement an ozone generator applying a conductive diamond electrode by the present invention;

FIG. 2-1 A surface view of an embodiment of a substrate of a conductive diamond electrode by the present invention;

FIG. 2-2 A longitudinal cross-section view of a conductive diamond electrode with a diamond film on the substrate surface of FIG. 2-1;

FIG. 3-1 A surface view of another embodiment of a substrate of a conductive diamond electrode by the present invention;

FIG. 3-2 A longitudinal cross-section view of a conductive diamond electrode with a diamond film on the substrate surface of FIG. 3-1;

FIG. 4-1 A surface view of the other embodiment of the substrate of a conductive diamond electrode by the present invention;

FIG. 4-2 A longitudinal cross-section view of a conductive diamond electrode with a diamond film on the substrate surface of FIG. 4-1;

FIG. 6-1~6-4 Block diagrams illustrating an increase of the triple phase boundary and an increase of the flow path by the present invention;

FIG. 7-1~7-4 Block diagrams illustrating other embodiments of an increase of the triple phase boundary and an increase of the flow path by the present invention;

DETAILED DESCRIPTION OF THE INVENTION

The following are detailed explanation, in reference to the figures, of a conductive diamond electrode and an ozone generator applying the conductive diamond electrode, by the present invention.

Figure 1:
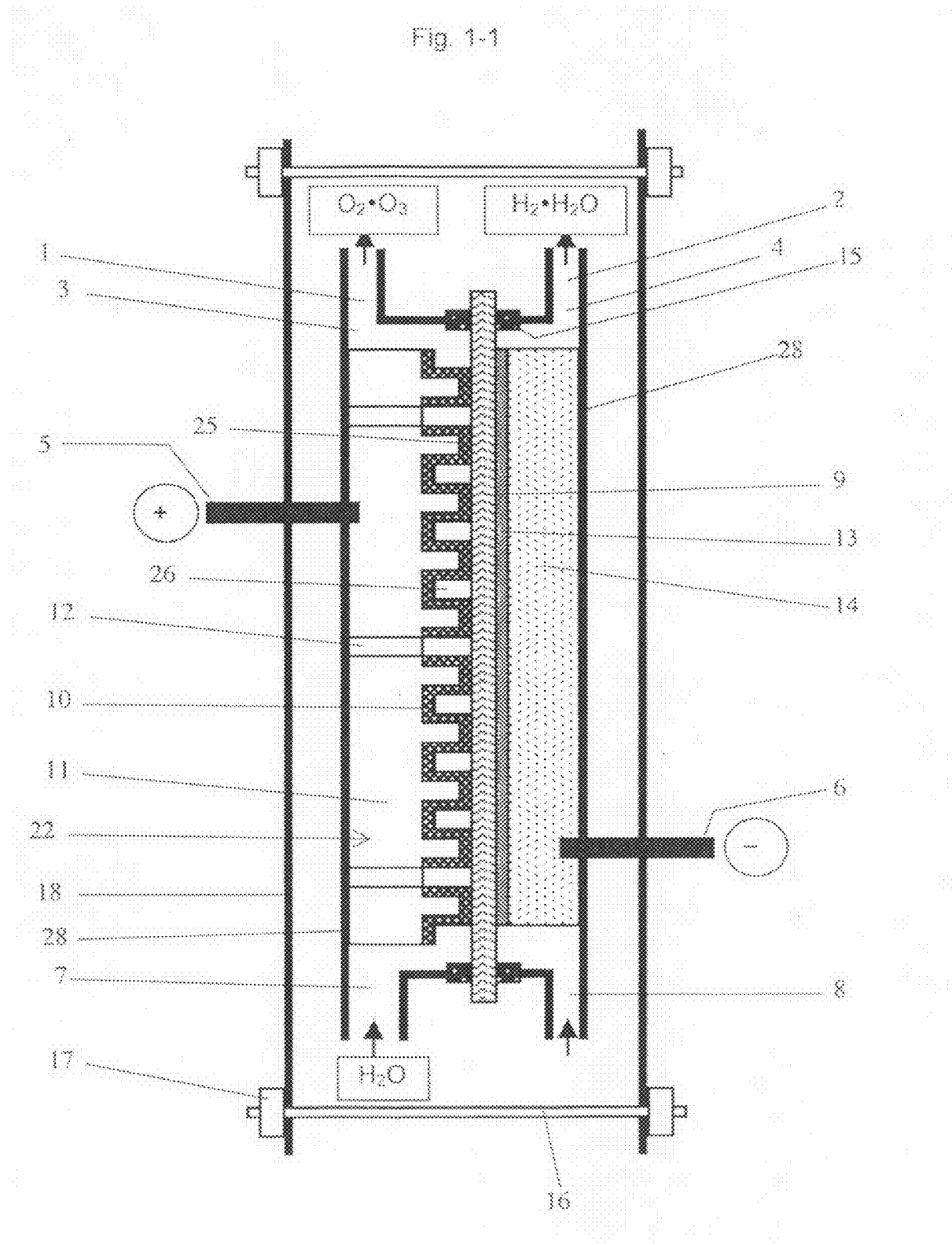
FIG. 1-1 A schematic view of an embodiment of an electrolytic cell to implement an ozone generator applying a conductive diamond electrode by the present invention.

FIG. 1-1 is a schematic view of an embodiment of an electrolytic cell to implement an ozone generator applying a conductive diamond electrode by the present invention. The number is assigned to each component as follows: anode compartment exit 1, cathode compartment exit 2, anode compartment 3, cathode compartment 4, anode feed terminal 5, cathodic feed terminal 6, anode compartment supply channel 7, cathode compartment supply channel 8, solid polymer electrolyte diaphragm comprising perfluorosulfonic acid cation exchange membrane 9, conductive diamond film 10, substrate 11, through hole 12, anode 22, cathode 13, cathodic current collector 14, sealing material 15, clamping bolt 16, nut 17, and press plate 18. For substrate 11, 5 cm×5 cm p-type silicon substrate (3 mm t) is used.

The anode 22 has the conductive diamond film 10 on the surface of the substrate 11, through which the through holes 12 are provided. The anode 22 and the cathode 13 are tightly attached, respectively, to each face of the solid polymer electrolyte diaphragm 9 comprising perfluorosulfonic acid cation exchange membrane, constituting a "zero-gap cell". The anode 22 and the cathode 13 are, respectively, accommodated in the anode compartment 3 and the cathode compartment 4; and the anode compartment 3 and the cathode compartment 4 are, respectively, provided with the anode compartment exit 1 and the cathode compartment exit 2, and the anode compartment supply channel 7 and the cathode compartment supply channel 8.

Electrical contacts between respective constituent materials, the anode 22 having the conductive diamond film 10 on the surface of the substrate 11 comprising the p-type silicon with convex and concave shapes, the cathode comprising the cathode 13, the cathodic current collector 14 and the solid polymer electrolyte diaphragm comprising perfluorosulfonic acid cation exchange membrane 9 are compressively joined by the clamping bolt 16, nuts 17 and the press plate 18. The contact pressure to the bolt nuts is 3 N·m, at which the contact pressure given to the ion exchange membrane by the anode is 30 kgf/cm$^2$.

Pure water fed through the anode compartment supply channel 7 to the anode compartment 3 is supplied to the contact surface of the conductive diamond film 10 with the solid polymer electrolyte diaphragm comprising perfluorosulfonic acid cation exchange membrane 9 via the through hole 12, where electrolytic reactions occur. In the anode compartment 3, ozone gas, oxygen gas, and hydrogen ions evolve; ozone gas and oxygen gas are vented through the anode compartment exit 1 outside the electrolytic cell; hydrogen ions having migrated to the surface of the cathode 13 via the solid polymer electrolyte diaphragm 9 combine with electrons to form hydrogen gas; and the hydrogen gas is vented outside the electrolytic cell through the cathode compartment exit 2.

Figures 1, 2:
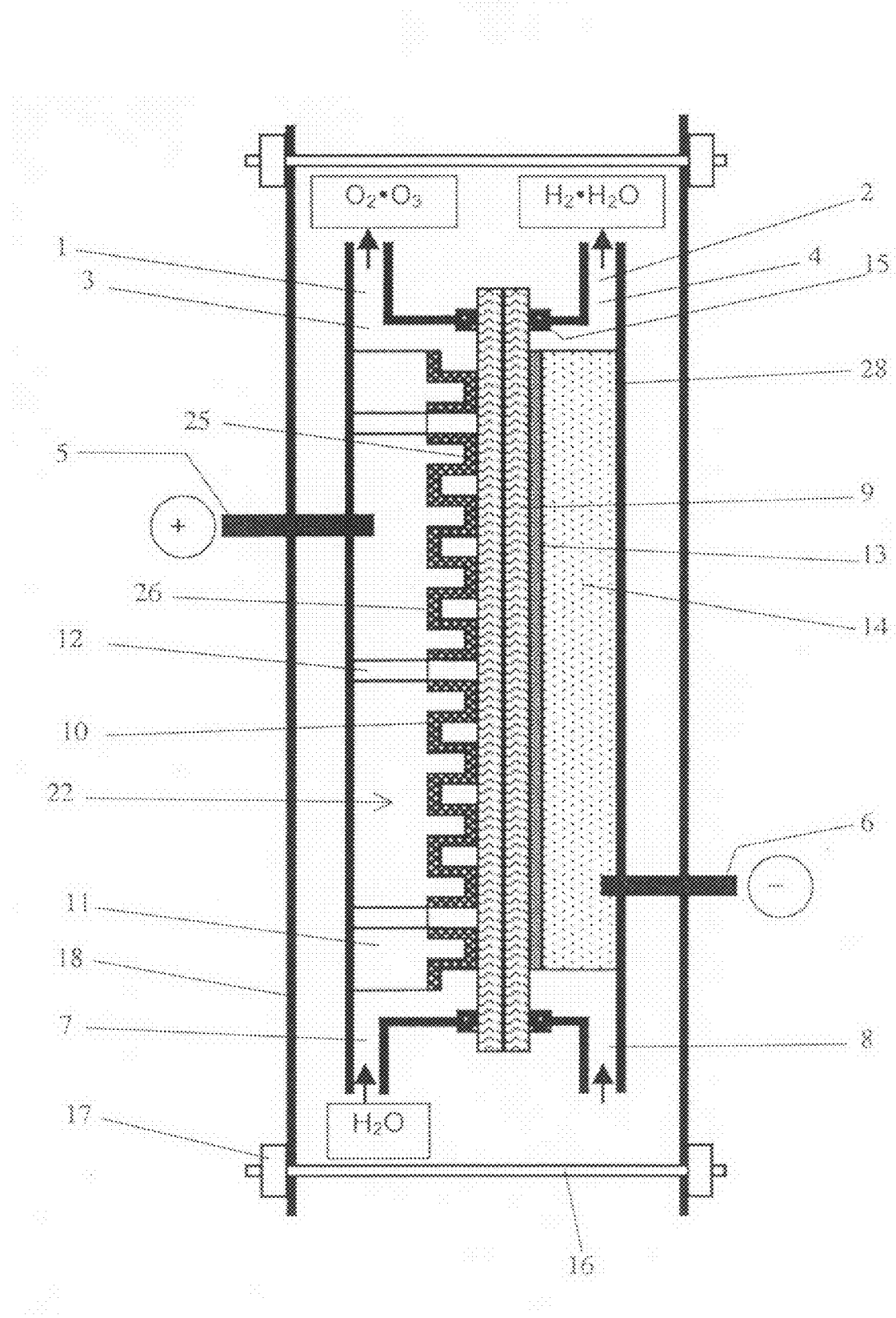
Figures 1, 2:
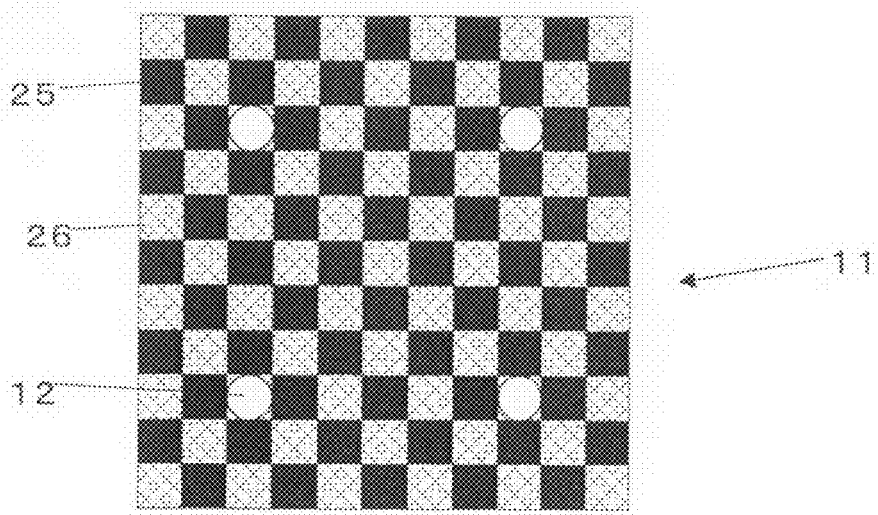
Figure 2:
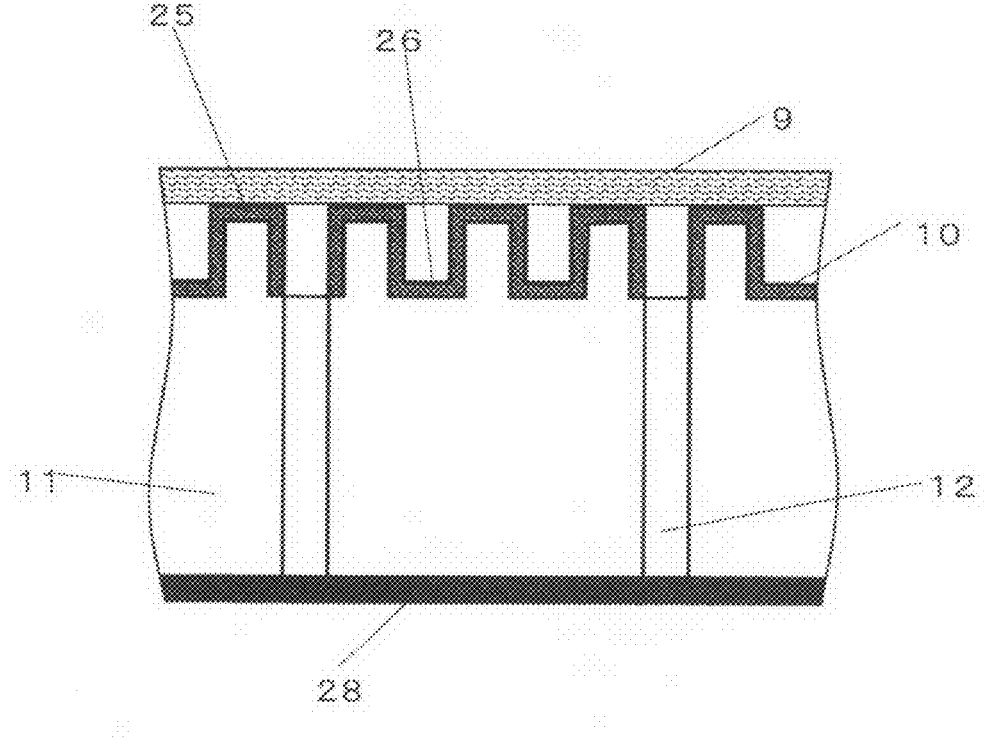

FIG. 1-2 is a schematic view of another embodiment of an electrolytic cell to implement an ozone generator applying a conductive diamond electrode by the present invention, in which two sheets of perfluorosulfonic acid cation exchange membrane are applied as the solid polymer electrolyte diaphragm 9.

FIG. 2-1 is a surface view of an embodiment of a substrate of a conductive diamond electrode by the present invention and FIG. 2-2 is a longitudinal cross-section view of a conductive diamond electrode with a diamond film on the substrate surface of FIG. 2-1. After a plurality of convex concave is formed at 0.5 mm pitch on the surface of the substrate 11 by dicing, multiple numbers of the through holes 12 are drilled from the rear face. The substrate 11, 5 cm×5 cm p-type silicon substrate (3 mm t), is immersed for texture processing in a fluoro-nitric acid solution prepared by mixing 35% hydrofluoric acid and 70% nitric acid (1:1), for 5 minutes at room temperature, followed by further immersion in a 10% aqueous solution of potassium hydroxide at 60 degree Celsius for 5 minutes. The number 25 indicates the convex part and 26 the concave part.

The silicon plate is rinsed with water and dried. As a seeding pre-treatment, diamond powder is mixed in isopropyl alcohol, in which the substrate is put; and ultrasonic wave is applied. As a filming method, the microwave plasma CVD process is applied at 2.45 GHz. Introduced gases are $H_2$, $CH_4$ and $B_2H_6$ at the flow rate of 800 sccm, 20 sccm, 0.2 sccm, respectively, at 3.2 kPa. The conductive diamond film 10 is formed by the microwave plasma CVD, containing boron as dopant. The total area of the convex top part, which is effective electrolysis area, is 6.25 cm$^2$.

Figures 2, 4:
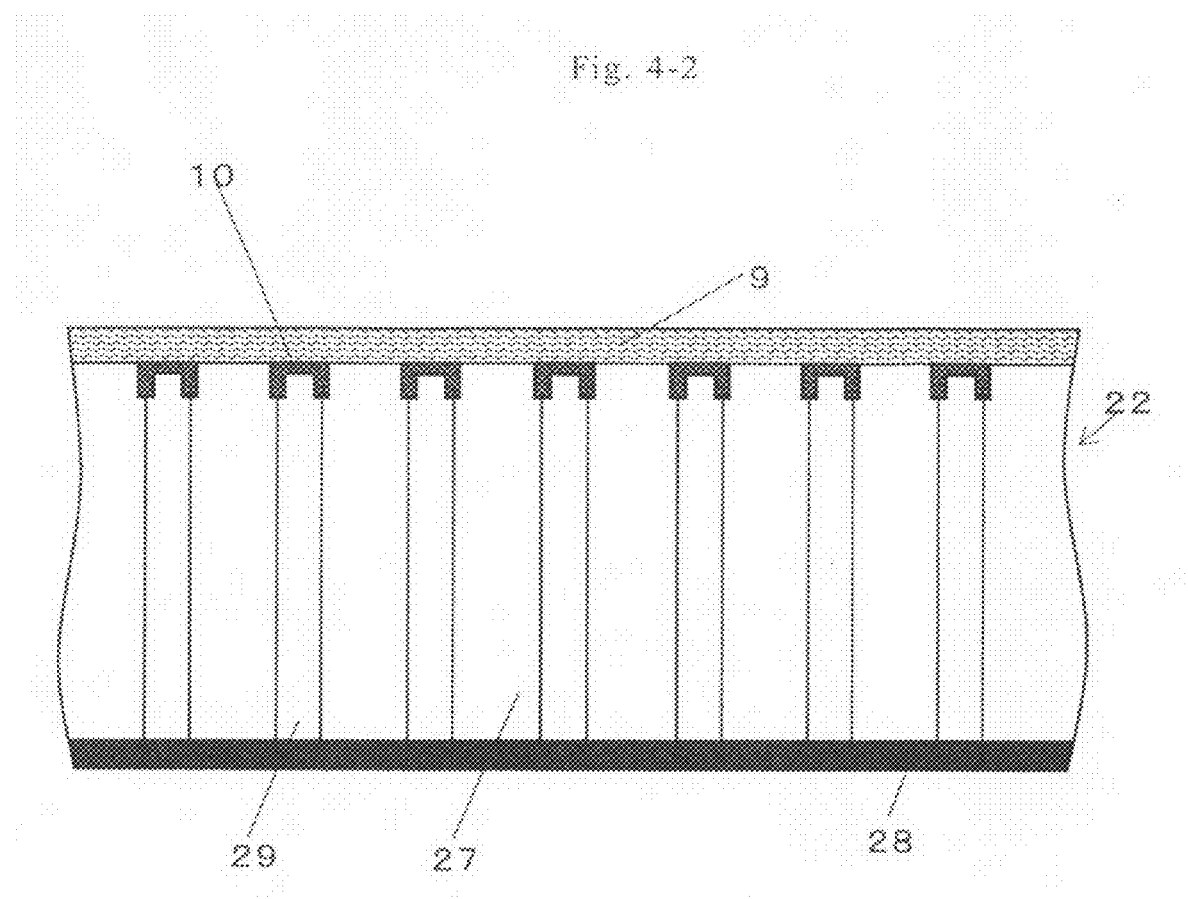

In the present invention, the convex part 25 on the surface of the conductive diamond film 10 contacts both the perfluorosulfonic acid cation exchange membrane 9, in various states, as shown in FIG. 6-1~6-4. Moreover, in order to make the entire contact surface of the convex part 25 and the perfluorosulfonic acid cation exchange membrane 9 to be the triple phase boundary 30, as shown in FIG. 7-1~7-4, the convex part 25 has fine structure and also in order to make water intrude the entire surface of the convex part 25 and make electrolytic gases to be liberated from the electrochemical reaction field swiftly, the convex part 25 must be 1 mm or less in width and exist over the entire surface of the electrode, as shown in FIG. 7-1~7-3. In this way, if the number of the convex part 25 is increased and the electrode surface is finely structured, both the area of the triple phase boundary 30 and flow paths for the electrolyte and generated gases increase, allowing smooth flow of fluid.

Figure 8A:
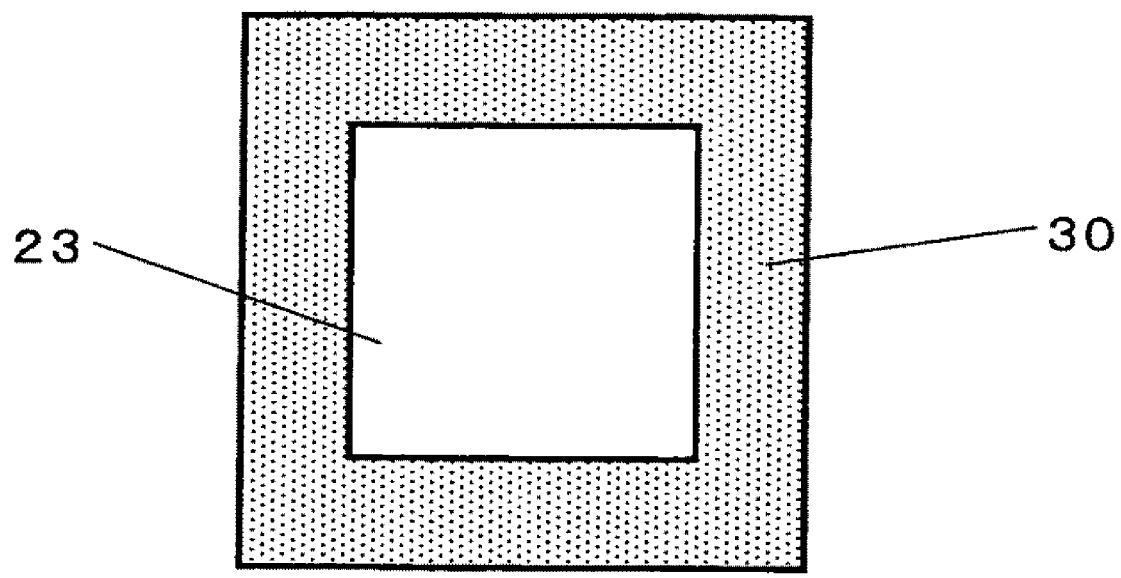
FIG. 8 Block diagrams illustrating further embodiments of an increase of the triple phase boundary and an increase of the flow path by the present invention.
Figure 8B:
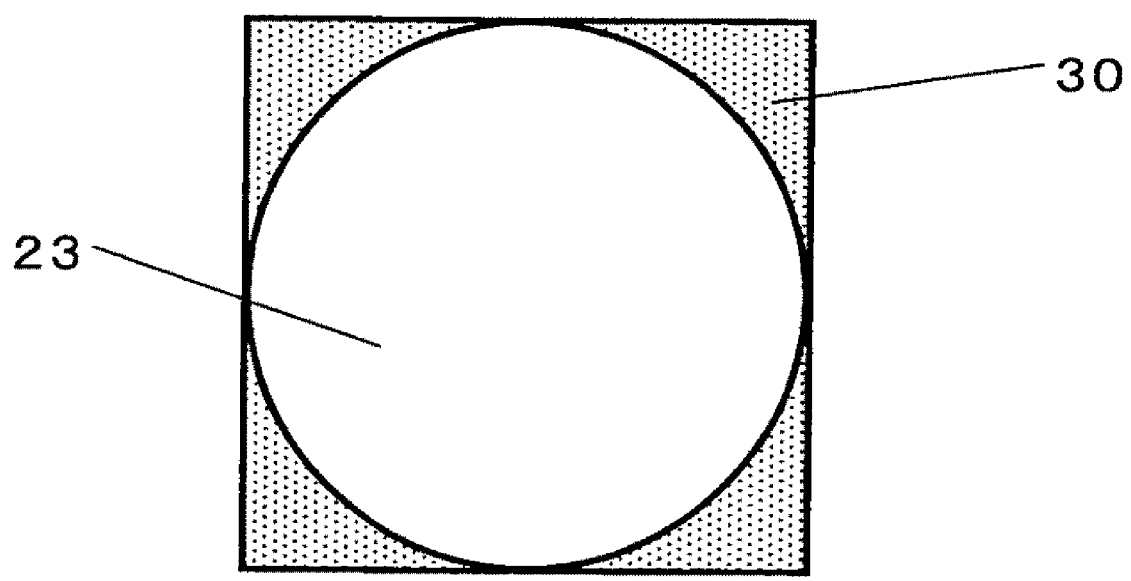

On the other hand, if the convex part 25 is widened to 2 mm or more, as shown in FIG. 7-4, the area 23, where no water always enters and therefore no electrochemical reaction occurs, appears at the center of the convex part 25, in spite that the convex part 25 contacts the perfluorosulfonic acid cation exchange membrane. Thus, in the area 23, where no water always enters and therefore no electrochemical reaction occurs, once electrolysis operation starts, a bubble will develop to cover the entire surface of the conductive diamond film 10, as shown in FIG. 8(a) to FIG. 8(b), reducing the triple phase boundary 30 to almost zero, rendering electrolysis to be impossible.

Whereas, in a zero-gap structure where the triple phase boundary is obtained by applying pressure to make the ion exchange membrane contact the electrode, if the convex part 25 is too fine, the convex part 25 becomes easy to break. Therefore, the convex part 25 is required to be 0.2 mm or more in width and to exist over the entire surface of the electrode.

In addition, to make water enter the entire surface of the convex part 25 and the fine triple phase boundary be formed over the entire surface of the convex part 25, it is necessary for the surface of the convex part 25 to have proper roughness, that is, Ra: 0.1 μm or more. On the other hand, if the surface roughness Ra is too large, the perfluorosulfonic acid cation exchange membrane becomes easy to break, and in view of this, the surface roughness Ra is required to be 10 μm or less, preferably in the range of 0.2-0.5 μm.

For saving the manufacturing cost of the conductive diamond electrode by the present invention, it is necessary to apply machine processing including dicing or drilling capable of manufacturing the convex concave structure without applying a plurality of high precision processing equipment.

Also, it is effective for the substrate 11 to have multiple numbers of the through hole 12 so that the gas vented from the surface of the convex part 25 to the concave part 26 or water supplied to the surface of the convex part 25 can smoothly leave from the back of the electrode.

According to the present invention, it is possible to obtain the same effect as the through hole 12 by disposing multiple numbers of substrate 11 with convex concave processing at an interval of the gap 27, as shown in FIG. 3-1 and FIG. 3-2, where the number 28 is the current distributor.

For the conductive diamond electrode, an applicable shape of each convex part 25 of the convex and concave part may include any of circle, ellipse, polygon, and others.

By this invention, it is also possible to provide the same effect as the diamond electrode recited in FIG. 2-1 and FIG. 2-2 by providing the substrate 29 with multiple striped patterns over the entire surface of the conductive diamond electrode disposed at an interval of the gap 27, as shown in FIG. 4-1 and FIG. 4-2, the surface of the substrate 29 of each stripe being coated with the diamond film 8, the substrate width being ranged from 0.2 mm to 1 mm, instead of providing multiple numbers of the substrate 11 with convex and concave processing.

Instead of a plurality of the substrate 29 with multiple stripe patterns, a substrate with projections in a shape including angular, circular, and other bristling in all directions may also be used.

According to the present invention, the ozone generator, comprising an electrode, as anode, surfacially coated with the conductive diamond film, a perfluorosulfonic acid cation exchange membrane, as a solid polymer electrolyte diaphragm, with the anode and the cathode closely adhered to each of the surfaces, stably electrolyses pure water supplied to the anode compartment when DC current is supplied between the anode and the cathode to generate ozone at a high concentration from the anode compartment and hydrogen from the cathode compartment.

In the present invention, the anode is prepared by pressing the conductive diamond film onto one face of the perfluorosulfonic acid cation exchange membrane at a contact pressure of 20 kgf/cm$^2$ or more. On the other face of the perfluorosulfonic acid cation exchange membrane, the cathode is pressed. Water supplied to the anode side is electrolyzed by DC current to generate ozone, thus constituting an ozone generator. If the applied pressing contact pressure is not enough large to obtain close contact between the conductive diamond film and the perfluorosulfonic acid cation exchange membrane, the effective area for electrochemical reaction is reduced, leading to an enlarged current density, rise of cell voltage, increased power consumption and large heat generation. The pressing contact pressure applied to press the conductive diamond film to the perfluorosulfonic acid cation exchange membrane must be 20 kgf/cm$^2$ or more at the contacted surface. When the value of pressing is large enough, sufficient contact is obtained, but, if the pressing is excessively large, the convex part may possibly be damaged. As shown in the embodiments of the present invention recited below, it is found that the variation in cell voltage stays small when the pressing pressure is in a range from 20 kgf/cm$^2$ to 50 kgf/cm$^2$.

In order to obtain a good contact effect between the conductive diamond film and the ion exchange membrane, one option may be to coat the conductive diamond film with ionomer having the same composition with the ion exchange membrane, followed by the hot press process. However, the conductive diamond film tends to detach easily during electrolysis due to thermal expansion of the material by heated electrolyte or joule's heat generation or possible dimensional change of the ion exchange membrane from water content condition; therefore, in order to secure the electrochemical reaction field in a stable way for a long time during electrolysis, it is necessary to maintain the contact between the conductive diamond film and the ion exchange membrane by pressurizing.

The anode having the conductive diamond film 10 on its surface is manufactured by loading diamond, as carbon source, which is reduction deposit of organic compounds, on the electrode substrate. The material and the shape of the electrode substrate are not specifically restricted as far as the material is conductive, and can be either in plate, mesh, or porous plate, for instance, of bibili fiber sintered body, comprising conductive silicon, silicon carbide, titanium, niobium and molybdenum, and as material, use of conductive silicon or silicon carbide with a similar thermal expansion rate to the diamond film is especially preferable. Moreover, in order to enhance adherence between the conductive diamond and the substrate, and also to increase effective surface area of the conductive diamond film to lower the current density per projected area, the surface of the substrate should preferably be rough to a certain extent.

When the conductive diamond is used in film state, the thickness of film should preferably be 10 μm-50 μm to increase durability and to reduce pin-hole development. A self-supported membrane 100 μm or more in thickness is also applicable for better durability, but in addition to increased difficulty in manufacturing and handling, cell voltage becomes too high, rendering the temperature control of electrolyte to be more complicated.

The method to load the conductive diamond film to the substrate has no specific limitation and is optional from among conventional methods. Typical manufacturing methods of the conductive diamond electrode include the hot filament CVD (chemical vapor deposition), microwave plasma CVD, plasma arcjet, and physical vapor deposition method (PVD), among which the microwave plasma CVD is preferable in view of a higher film-making rate and uniform film preparation available.

The microwave plasma CVD method is the process in which the hydrogen-diluted mixture gas of carbon source like methane and dopant source like borane is introduced into the reaction chamber, connected with a microwave transmitter via a waveguide, in which a film forming substrate of conductive diamond, such as conductive silicon, alumina and silicon carbide is disposed, so that plasma is generated within the reaction chamber to develop conductive diamond on the substrate. By microwave plasma, ions little oscillate and chemical reaction is promoted at a pseudo-high temperature condition where only electrons are made oscillated. Output of plasma is 1-5 kW, the larger the output, the more the active species can be generated and the rate of diamond growth accelerated. Advantage of using plasma lies in the fact that diamond filming is possible at a high speed on a large surface area substrate.

For providing conductivity to diamond, a trace amount of elements having different atomic values is added. The content of boron or phosphorus is preferably 1-100000 ppm, or more preferably 100-10000 ppm. As the raw material for this additive element, boron oxide or diphosphorus pentoxide, which is less toxic, is applicable. The conductive diamond, thus manufactured and loaded on the substrate, can be connected to the current collector comprising conductive substances, such as titanium, niobium, tantalum, silicon, carbon, nickel and tungsten carbide, in a configuration of flat plate, punched plate, metal mesh, powder-sintered body, metal fiber, and metal fiber-sintered body.

As the perfluorosulfonic acid cation exchange membrane used for the solid polymer electrolyte diaphragm 9, a commercially available perfluorosulfonic acid cation exchange membranes is applied (Trade name: Nafion 117, manufactured by Du Pont, Thickness shown in catalog: 183 μm). The membrane is immersed in boiled pure water for 30 minutes for water swelling treatment.

The cathode 13 is manufactured in the following manner. PTFE dispersion (manufactured by Du Pont Mitsui Fluorochemicals 31-J) and aqueous dispersion liquid of platinum-loaded carbon catalyst are mixed and dried, to which solvent naphtha is added, followed by kneading. Through the rolling, drying and sintering processes, the cathode 13 of PTFE 40%, platinum-loaded carbon catalyst 60%, 120 μm thick, and with porosity 55% is obtained.

The cathodic current collector is made of a stainless steel fibrous sintered body with 2.5 mm in thickness. (Manufactured by Tokyo Rope Mfg.)

EXAMPLES

The following are exemplary embodiments of the present invention and comparative examples. Provided, however, the present invention shall not be limited to these exemplary embodiments.

Example 1

As the perfluorosulfonic acid cation exchange membrane, a commercially available perfluorosulfonic acid cation exchange membrane is applied (Trade name: Nafion 117, manufactured by Du Pont, Thickness shown in catalog: 183 μm). The membrane is immersed in boiled pure water for 30 minutes for water swelling treatment.

The anode comprising the conductive diamond electrode is immersed in a mixed acid solution prepared by 1:1 mixture of 35% hydrofluoric acid and 70% nitric acid for 5 minutes at a room temperature for texture processing on the surface of 5 cm×5 cm p-type silicon substrates (3 mm t), followed by further immersion in an aqueous solution of 10% potassium hydroxide for 5 minutes at 60 degree Celsius. The surface roughness Ra of the applied silicon substrate is in a range from 0.1 μm to 4 μm, with locally some unevenness.

Many convex concave shapes are formed by dicing using a diamond saw. The diamond saw with 2.0 μm in thickness is used for manufacturing each sample.

Formed silicon plate provided with convex concave parts is rinsed with water and dried. For the pretreatment, the substrate is dipped in the isopropyl alcohol in which diamond powder has been mixed, and ultrasonic wave is applied for seeding. Filming is made by the plasma CVD at 2.45 GHz, feeding $H_2$, $CH_4$, and $B_2H_6$ gases at a flow rate of 800 sccm, 20 sccm, 0.2 sccm, respectively and at 3.2 kPa of the gas pressure. The conductive diamond film containing boron as dopant is prepared by the microwave plasma CVD.

Samples 1-7 are the coating applied on the surface of the diamond film 10 having numerous convex and concave parts over the entire surface as shown in FIG. 2-1, where Samples 1-6 have a shape of square and Sample 7 has a shape of a strap-like rectangle. The substrate 11 has a plurality of through holes 12 so that gases vented from the surface of the convex part 25 to the concave part 26 or water supplied to the surface of the convex part 25 can circulate smoothly from the rear of the electrode. Table 1 shows the width of the convex part and concave part, the length of the convex part, the depth of the concave part, of Samples 1-7. The total surface area of the convex part, constituting an effective electrolytic area, is 6.25 $cm^2$ for Samples 1-6, and 15 $cm^2$ for Sample 7.

The sum of area of the opening part of the through holes of Samples 1-7 is 10% of the projected area of the electrode structure. The surface roughness Ra of the convex part is in a range from 0.2 μm to 0.5 μm.

The cathode is manufactured in the following manner. PTFE dispersion (manufactured by Du Pont Mitsui Fluorochemicals 31-J) and aqueous dispersion liquid of platinum-loaded carbon catalyst are mixed and dried, to which solvent naphtha is added, followed by kneading. Through the rolling, drying and sintering processes, the cathode of PTFE 40%, platinum-loaded carbon catalyst 60%, 120 μm thick, and with porosity 55% is obtained.

The cathodic current collector is made of a stainless steel fibrous sintered body with 2.5 mm thickness. ((Manufactured by Tokyo Rope Mfg.)

Figure 5:
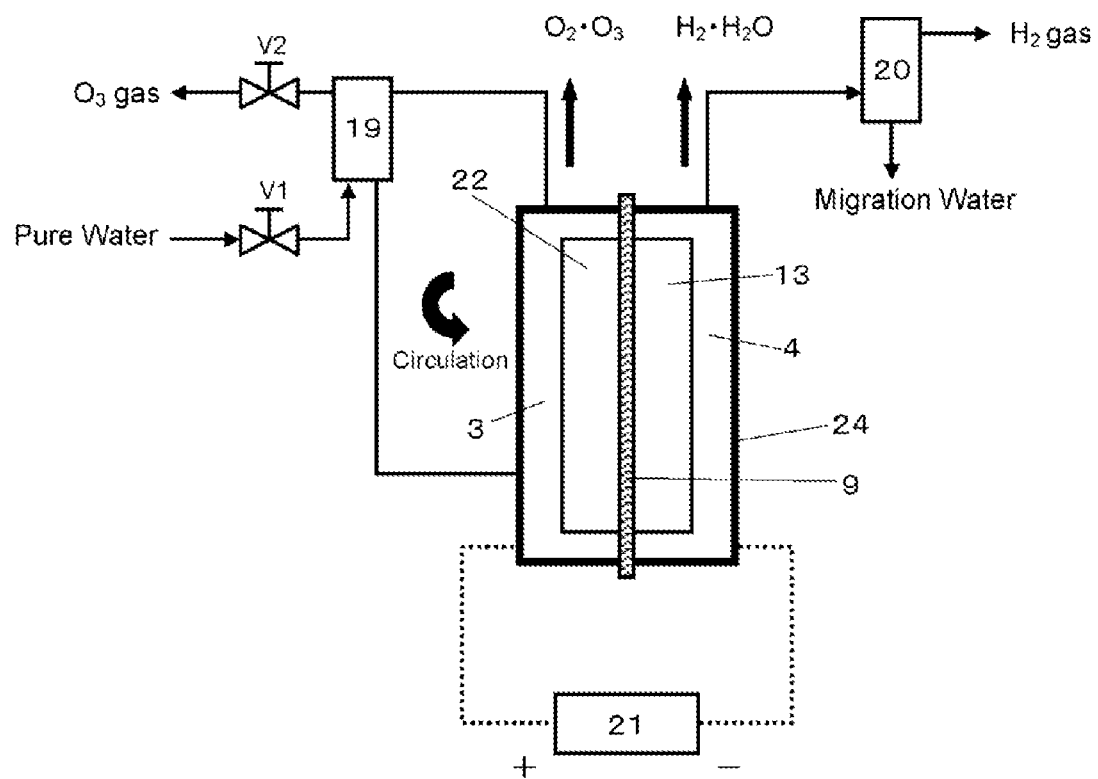
FIG. 5 A block diagram of an embodiment of an ozone generator by the present invention.

As shown in FIG. 5, the electrolytic cell 24 is connected to the gas-liquid separator 19 on the side of anode, the gas-liquid separator 20 on the side of cathode and the DC power source 21, and carries out electrolysis operation. The electrolysis current is 6.25 A. At the start of operation, the temperature of pure water as electrolyte in the anode compartment is 23 degree Celsius and water electrolysis is performed without cooling.

Electric contact between respective constituent materials and the physical contact between each electrode and the perfluorosulfonic acid cation exchange membrane are achieved by means of contact pressure to the bolt and nut. When the contact pressure value is small, insufficient contact effect occurring between the electrode, such as the conductive diamond electrode and the perfluorosulfonic acid cation exchange membrane results in a reduced effective area for electrolysis, leading to a rise in cell voltage, successive large power consumption and large heat generation. On the contrary, when the contact pressure value is too large, the convex part may be damaged, though the contact effect will be sufficient. In the research, using Sample 4, of the relationship between the contact pressure value and the cell voltage, conducted prior to the discussion, the results are as shown in Table 3: below 1 N·m, cell voltage decreases with increase in contact pressure; in the range of 2 N·m-5 N·m, cell voltage variation with increase in contact pressure is small, and therefore, in the subsequent experiments, the contact pressure is preset to 3 N·m. The maximum supply power voltage is also preset to 24V.

When current is supplied from the DC power source 21, mixed gas of ozone and oxygen evolve from the anode and hydrogen gas evolves from the cathode. Tables 1-1/1-2 show the cell voltage change with time lapse and the current efficiency in terms of ozone generation after three hours, observed at a current density of 0.32 $A/cm^2$, and Tables 2-1/2-2 show the equivalents of them at a current density of 1 $A/cm^2$.

TABLE 1-1

| Sample No. | Width of Convex part mm | Length of Convex part mm | Width of Concave part mm | Depth of Concave part mm | Total area of Convex part cm² |
|---|---|---|---|---|---|
| 1 | 0.1 | 0.1 | 0.1 | 0.5 | 6.25 |
| 2 | 0.2 | 0.2 | 0.2 | 0.5 | 6.25 |
| 3 | 0.5 | 0.5 | 0.5 | 0.5 | 6.25 |
| 4 | 1 | 1 | 1 | 0.5 | 6.25 |
| 5 | 2 | 2 | 2 | 0.5 | 6.25 |
| 6 | 5 | 5 | 5 | 0.5 | 6.25 |
| 7 | 10 | 50 | 5 | 0.5 | 15 |

TABLE 1-2

| Sample No. | Current at operation start A | Current density at operation start A/cm² | Cell voltage at operation start V | Cell voltage after 30 min. V | Cell voltage after 3 hours V | Current efficiency in terms of ozone output % | Judgment | Recitals |
|---|---|---|---|---|---|---|---|---|
| 1 | 2 | 0.32 | 10.4 | 11.3 | 13.7 | 28 | B | Many breakages found at convex part in disassembly. |
| 2 | 2 | 0.32 | 10.4 | 10.1 | 10.1 | 29 | A | |
| 3 | 2 | 0.32 | 10.4 | 10.1 | 10.1 | 29 | A | |
| 4 | 2 | 0.32 | 10.4 | 10.1 | 10.1 | 32 | A | |
| 5 | 2 | 0.32 | 13.9 | 15.2 | 22.8 | 18 | C | |
| 6 | 2 | 0.32 | 20.9 | 22 | 24 | 13 | C | Current after 3 hours: 0.2 A |
| 7 | 4.8 | 0.32 | 23.3 | 24 | 24 | 13 | C | Current after 3 hours: 0.2 A |

TABLE 2-1

| Sample No. | Width of Convex part mm | Length of Convex part mm | Width of Concave part mm | Depth of Concave part mm | Total area of Convex part cm² |
|---|---|---|---|---|---|
| 1 | 0.1 | 0.1 | 0.1 | 0.5 | 6.25 |
| 2 | 0.2 | 0.2 | 0.2 | 0.5 | 6.25 |
| 3 | 0.5 | 0.5 | 0.5 | 0.5 | 6.25 |
| 4 | 1 | 1 | 1 | 0.5 | 6.25 |

TABLE 2-2

| Sample No. | Setting current A | Setting current density A/cm² | Cell voltage at operation start V | Cell voltage after 30 min. V | Cell voltage after 3 hours V | Current efficiency in terms of ozone output % | Cell voltage after 24 hours V | Judgment | Recitals |
|---|---|---|---|---|---|---|---|---|---|
| 1 | 6.25 | 1 | 12.6 | 14.3 | 24 | Immeasurable | — | C | Current after 3 hours: 0.1 A or below. Many breakages found at convex part in disassembly |
| 2 | 6.25 | 1 | 12.6 | 12 | 11.8 | 38 | 11.7 | A | |
| 3 | 6.25 | 1 | 12.6 | 12.1 | 11.8 | 38 | 11.7 | A | |
| 4 | 6.25 | 1 | 12.6 | 12 | 11.7 | 39 | 11.6 | A | |

TABLE 3

(Experiments to determine the contact pressure value using Sample 4)

| Contact pressure N · m | Cell voltage V | Surface pressure kgf/cm² |
|---|---|---|
| Hand fastening | 4.58 | |
| 0.2 | 4.46 | 2 |
| 0.5 | 4.36 | 5 |

TABLE 3-continued (Experiments to determine the contact pressure value using Sample 4)

| Contact pressure N · m | Cell voltage V | Surface pressure kgf/cm² |
|---|---|---|
| 1 | 4.31 | 10 |
| 2 | 4.13 | 20 |
| 3 | 4.09 | 30 |
| 4 | 4.08 | 40 |
| 5 | 4.08 | 50 |

It is know from the experiments that in Samples 2-4 having the convex part with a width ranging from 0.2 mm to 1 mm, cell voltage does not rise in a consecutive 3 hours' operation, maintaining a high current efficiency in terms of ozone generation. From these results, it is recognized that in the electrochemical reaction field, water supply or gas liberation is carried out swiftly and necessary conditions for electrolysis are maintained at the electrochemical reaction field without deterioration with time.

On the contrary, with Sample 1 having the convex part with 0.1 mm wide, cell voltage rises and ozone generation efficiency deteriorates and breakages of the convex part are found in the post-experiment observation of the anode. With Sample 5-7 having the convex part with more than 2 mm wide, it is found that cell voltage rises and ozone generation efficiency remarkably deteriorates. It is also found in the observation after disassembly that only the edge of the convex part is wet with electrolyte, from which the cause of the cell voltage increase may be attributed to the electrolyte that has not been supplied to the entire surface of the electrode.

Moreover, in Samples 2-4 having the convex part with a width ranging from 0.2 mm to 1 mm, cell voltage does not rise in a consecutive 3 hours operation at 1 A/cm², as known from Table 2, maintaining a high current efficiency in terms of ozone generation. From these results, it is recognized that in the electrochemical reaction field, water supply or gas liberation is carried out swiftly and necessary conditions for electrolysis are maintained at the electrochemical reaction field without deterioration with time.

INDUSTRIAL APPLICABILITY

The conductive diamond electrode by the present invention has a high mechanical strength and therefore can be used for such electrolysis as zero-gap electrolysis which commonly requires a high mechanical strength; and the ozone generator applying the conductive diamond electrode by the present invention maintains stable operation for a long time and therefore can be used in such facilities as waterworks and sewage plants.

| FIGURE LEGEND |
|---|
| 1  Anode compartment exit |
| 2  Cathode compartment exit |
| 3  Anode compartment |
| 4  Cathode compartment |
| 5  Anodic feed terminal |
| 6  Cathodic feed terminal |
| 7  Anode compartment supply channel |
| 8  Cathode compartment supply channel |
| 9  Solid polymer electrolyte diaphragm comprising perfluorosulfonic acid cation exchange membrane |
| 10 Conductive diamond film |
| 11 Substrate |
| 12 Through hole |
| 13 Cathode |
| 14 Cathodic current collector |
| 15 Sealing material |
| 16 Clamping bolt |
| 17 Nut |
| 18 Press plate |
| 19 Anode side gas liquid separator |
| 20 Cathode side gas liquid separator |
| 21 DC power source for electrolysis |
| 22 Anode |
| 23 Area no water always entering and no electrolytic reaction occurring |
| 24 Electrolytic cell |
| 25 Convex part |
| 26 Concave part |
| 27 Gap |
| 28 Current distributor |
| 29 Substrate of a stripe pattern |
| 30 Triple phase boundary |

The invention claimed is:

1. A conductive diamond electrode, comprising:
a substrate having a plurality of convex and concave parts disposed over an entire surface of the substrate; and
a diamond film coated on the surface of said substrate, wherein
each of said convex and concave parts is formed in the shape of a square, and
a width of each of said convex parts is in a range from 0.2 mm to 1 mm.

2. The conductive diamond electrode according to claim 1, wherein surfaces of the convex parts have a roughness $R_a$ of 0.2 µm to 0.5 µm.

3. An ozone generator, comprising: a cathode closely adhered to a first face of a solid polymer electrolyte diaphragm comprised of a perfluorosulfonic acid cation exchange membrane; an anode closely adhered to a second face of said perfluorosulfonic acid cation exchange membrane; an anode compartment for holding water; and an anode-cathode gap supplied with DC current by a DC current supply, wherein the conductive diamond electrode according to claim 2 is used as the anode, the water is electrolyzed by the DC current supplied to the anode-cathode gap, and ozone is produced from the anode compartment.

4. An ozone generator, comprising: a cathode and an anode adhered to a solid polymer electrolyte diaphragm comprised of a perfluorosulfonic acid cation exchange membrane; an anode compartment for holding water; and an anode-cathode gap supplied with DC current by a DC current supply, wherein the cathode is pressed onto a first face of said perfluorosulfonic acid cation exchange membrane, the conductive diamond electrode according to claim 2 is used as the anode, the conductive diamond film of the conductive diamond electrode is pressed onto a second face of said perfluorosulfonic acid cation exchange membrane at 20 kgf/cm² or more, the water is electrolyzed by the DC current supplied to the anode-cathode gap, and ozone is produced from the anode compartment.

5. The conductive diamond electrode according to claim 1, wherein said substrate is provided with a through hole.

6. An ozone generator, comprising: a cathode closely adhered to a first face of a solid polymer electrolyte diaphragm comprised of a perfluorosulfonic acid cation exchange membrane; an anode closely adhered to a second face of said perfluorosulfonic acid cation exchange membrane; an anode compartment for holding water; and an anode-cathode gap supplied with DC current by a DC current supply, wherein the conductive diamond electrode according to claim 5 is used as the anode, the water is electrolyzed by the DC current supplied to the anode-cathode gap, and ozone is produced from the anode compartment.

7. An ozone generator, comprising: a cathode and an anode adhered to a solid polymer electrolyte diaphragm comprised of a perfluorosulfonic acid cation exchange membrane; an anode compartment for holding water; and an anode-cathode gap supplied with DC current by a DC current supply, wherein the cathode is pressed onto a first face of said perfluorosulfonic acid cation exchange membrane, the conductive diamond electrode according to claim 5 is used as the anode, the conductive diamond film of the conductive diamond electrode is pressed onto a second face of said perfluorosulfonic acid cation exchange membrane at 20 kgf/cm² or more, the water is electrolyzed by the DC current supplied to the anode-cathode gap, and ozone is produced from the anode compartment.

8. An ozone generator, comprising: a cathode closely adhered to a first face of a solid polymer electrolyte diaphragm comprised of a perfluorosulfonic acid cation exchange membrane; an anode closely adhered to a second face of said perfluorosulfonic acid cation exchange membrane; an anode compartment for holding water; and an anode-cathode gap supplied with DC current by a DC current supply, wherein the conductive diamond electrode according to claim 1 is used as the anode, the water is electrolyzed by the DC current supplied to the anode-cathode gap, and ozone is produced from the anode compartment.

9. An ozone generator, comprising: a cathode and an anode adhered to a solid polymer electrolyte diaphragm comprised of a perfluorosulfonic acid cation exchange membrane; an anode compartment for holding water; and an anode-cathode gap supplied with DC current by a DC current supply, wherein the cathode is pressed onto a first face of said perfluorosulfonic acid cation exchange membrane, the conductive diamond electrode according to claim 1 is used as the anode, the conductive diamond film of the conductive diamond electrode is pressed onto a second face of said perfluorosulfonic acid cation exchange membrane at 20 kgf/cm² or more, the water is electrolyzed by the DC current supplied to the anode-cathode gap, and ozone is produced from the anode compartment.

10. A conductive diamond electrode, comprising:
a substrate having a plurality of convex and concave parts disposed over an entire surface of the substrate; and
a diamond film coated on the surface of said substrate, wherein
a width of each of said convex parts is in a range from 0.2 mm to 1 mm, and
said conductive electrode is comprised of segments and disposed with intervals to provide paths for electrolyte and generated gases between said segments of the conductive diamond electrode.

11. An ozone generator, comprising: a cathode closely adhered to a first face of a solid polymer electrolyte diaphragm comprised of a perfluorosulfonic acid cation exchange membrane; an anode closely adhered to a second face of said perfluorosulfonic acid cation exchange membrane; an anode compartment for holding water; and an anode-cathode gap supplied with DC current by a DC current supply, wherein the conductive diamond electrode according to claim 10 is used as the anode, the water is electrolyzed by the DC current supplied to the anode-cathode gap, and ozone is produced from the anode compartment.

12. An ozone generator, comprising: a cathode and an anode adhered to a solid polymer electrolyte diaphragm comprised of a perfluorosulfonic acid cation exchange membrane; an anode compartment for holding water; and an anode-cathode gap supplied with DC current by a DC current supply, wherein the cathode is pressed onto a first face of said perfluorosulfonic acid cation exchange membrane, the conductive diamond electrode according to claim 10 is used as the anode, the conductive diamond film of the conductive diamond electrode is pressed onto a second face of said perfluorosulfonic acid cation exchange membrane at 20 kgf/cm² or more, the water is electrolyzed by the DC current supplied to the anode-cathode gap, and ozone is produced from the anode compartment.

13. A conductive diamond electrode, comprising:
a plurality of strip-state substrates disposed with intervals on an entire surface of the conductive diamond electrode; and
a diamond film applied on the surface of each of said substrates or substrate, wherein
a width of each of said substrates or substrate is in a range from 0.2 mm to 1 mm.

14. An ozone generator, comprising: a cathode closely adhered to a first face of a solid polymer electrolyte diaphragm comprised of a perfluorosulfonic acid cation exchange membrane; an anode closely adhered to a second face of said perfluorosulfonic acid cation exchange membrane; an anode compartment for holding water; and an anode-cathode gap supplied with DC current by a DC current supply, wherein the conductive diamond electrode according to claim 13 is used as the anode, the water is electrolyzed by the DC current supplied to the anode-cathode gap, and ozone is produced from the anode compartment.

15. An ozone generator, comprising: a cathode and an anode adhered to a solid polymer electrolyte diaphragm comprised of a perfluorosulfonic acid cation exchange membrane; an anode compartment for holding water; and an anode-cathode gap supplied with DC current by a DC current supply, wherein the cathode is pressed onto a first face of said perfluorosulfonic acid cation exchange membrane, the conductive diamond electrode according to claim 13 is used as the anode, the conductive diamond film of the conductive diamond electrode is pressed onto a second face of said perfluorosulfonic acid cation exchange membrane at 20 kgf/cm² or more, the water is electrolyzed by the DC current supplied to the anode-cathode gap, and ozone is produced from the anode compartment.

* * * * *